Patented Oct. 11, 1927.

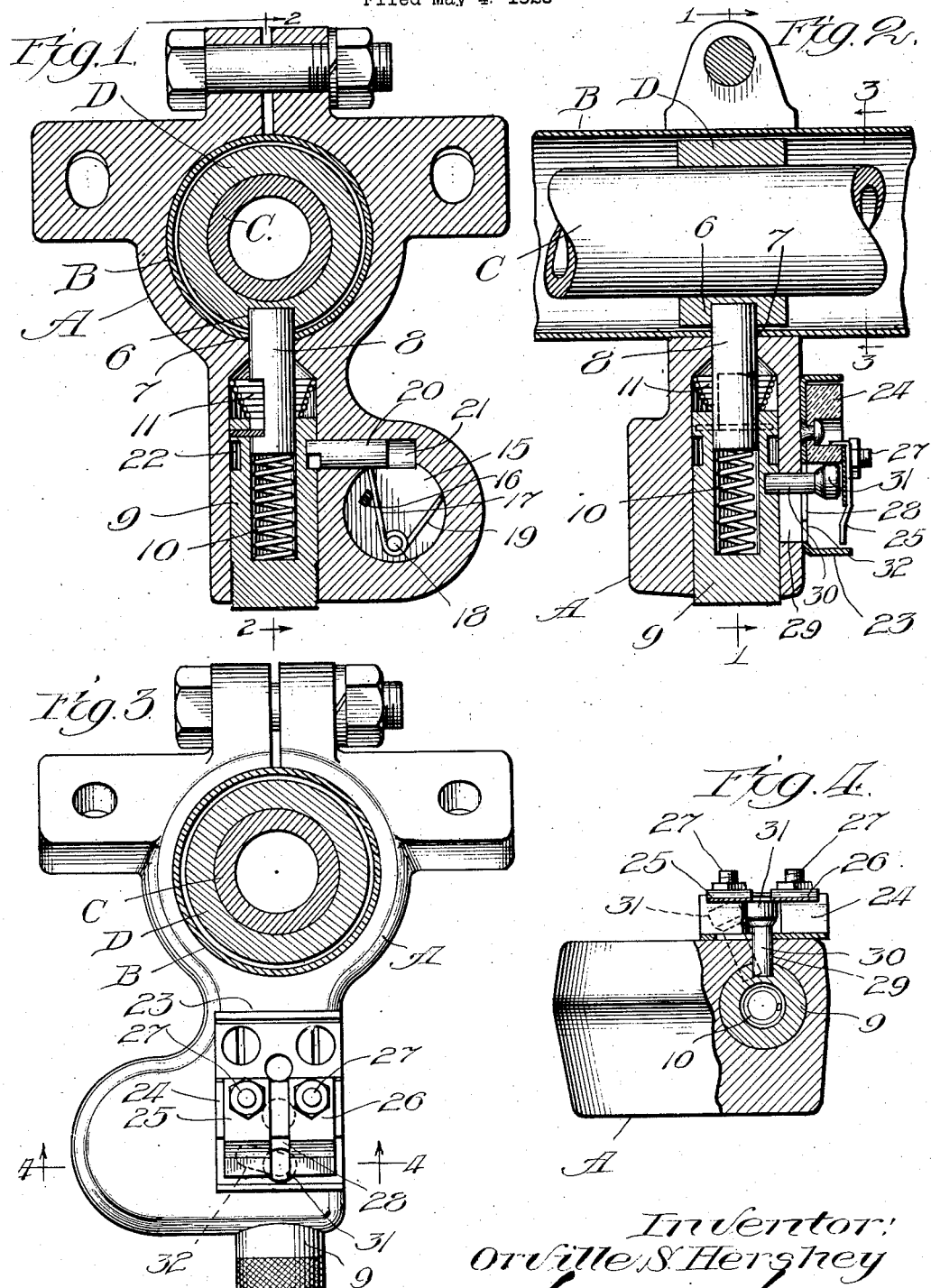

1,645,382

UNITED STATES PATENT OFFICE.

ORVILLE S. HERSHEY, OF CHICAGO, ILLINOIS, ASSIGNOR TO HERSHEY MANUFACTURING COMPANY, OF CHICAGO, ILLINOIS, A CORPORATION OF COLORADO.

AUTOMOBILE LOCK.

Application filed May 4, 1925. Serial No. 27,661.

This invention relates to a lock adapted especially for automobiles, and designed more particularly for association with one of the operating units thereof. It may be connected with a steering mechanism, a change speed mechanism, a motor ignition circuit, or any other unit or system whose operation is required in the use of the vehicle.

The embodiment of my invention which is herein shown and described includes a switch which may be interposed in the motor ignition circuit. Such a switch is designed to be opened, thereby disabling the motor, whenever the lock is operated to interfere with the use of an associated mechanism. It is desirable, however, that special provision be made for opening the circuit independently of the lock if and when any emergency arises. The present lock is accordingly equipped with means for accomplishing this result.

In my Patent No. 1,442,765 granted January 16, 1923, I disclose a lock and interconnected switch having a single control means adapted, when actuated, to be moved into two positions. In the first, the switch alone is operated, whereas the lock is not moved until the control means had reached a second position. In the present invention similar results are obtained by the use of a single control means movable in either of two ways. With execution of its normal movement both the switch and lock are operated conjointly, but if the control be moved otherwise, the switch alone is opened. By incorporating into a lock structure a control means of the kind described, it is possible to stop the motor without disabling any of the remaining units with which the lock may be associated. My invention is accordingly concerned with the provision of a lock having the characteristics noted, and with various other objects and purposes which will hereinafter appear.

The exemplification of my invention shown in the accompanying drawing is such as may be associated with an automobile steering mechanism. It is designed for attachment to a fixed part of the vehicle and to the column through which the steering post is extended. The description to follow will accordingly refer to a lock which is adapted especially for cooperation with the steering mechanism, although, as above suggested, it may be elsewhere employed. In using the terms "open" and "closed" with reference to the motor ignition circuit, I have in mind the system of ignition most generally employed, but knowing that magneto-equipped motors may be operated on an open circuit, which is the reverse of the prevailing kind, these terms should be properly interpreted to describe the true situation.

In the drawing:

Figs. 1 and 2 are sectional views through a steering column and associated lock, taken, respectively, on line 1—1 of Fig. 2 and line 2—2 of Fig. 1;

Fig. 3 is a sectional view through the column, taken on line 3—3 of Fig. 2, showing in elevation the rear or under side of the lock; and Fig. 4 is a detail in section, taken on line 4—4 of Fig. 3.

The present lock may be contained within a housing A through which is an opening for accommodating the column B within which is extended a post C which connects the steering wheel with the swiveled running wheels, usually at the front of an automobile. Secured fast to the post is a collar D having therein a groove or socket 6 which may be brought into register with an opening 7 formed in the column.

In this invention I am not concerned particularly with the form or kind of locking mechanism which is employed. It will suffice to note that the structure shown in the drawing includes a bolt 8 which is adapted to be projected through the opening 7 into the socket 6 so as to lock the steering post against rotation. This bolt is associated yieldingly with a hollow plunger 9 wherein is accommodated a compression spring 10 which tends to project the bolt into locking position. A second spring 11 exerts an opposite force upon the plunger such as to retract the same whenever conditions will permit. The rear or outer end of the plunger is normally projected from the housing (see Fig. 3) so as to be conveniently accessible for operation.

The plunger which serves as a control means for the locking bolt is adapted for reciprocal movements within the housing, and also for limited rotation therein, as will presently appear. Its in and out movements are subject to the control of a lock comprising a cylinder 15 operable with the aid of a removable key (not shown) which cooperates with the tumblers thereof. At the rear end of the cylinder is an eccentric lug 16 adapted, when turned in response to movements of the key, to bear against one arm 17 of a spring which is coiled around a stud 18, thus presenting a second arm 19 against a wall of the housing. The spring arm 17 is connected with a pin 20 slidably mounted in a bore 21 which extends laterally toward the passage in which the plunger 9 is mounted. The acting end of the pin is receivable within an annular groove 22 of the plunger when the same is in its inner or advanced position (see Fig. 1). This relationship of the parts obtains when the lock has been operated to disable the associated automobile mechanism. It is only when the key has rotated the cylinder lock to thereby retract the pin from the groove 22 that the plunger is free to spring back and carry with it the locking bolt. When this action has taken place, the associated automobile mechanism is restored to operativeness.

I associate with a lock structure having the general characteristics noted an ignition switch which may include a frame 23 in which is carried an insulating block 24 for the mounting of fixed contacts which may take the form of a pair of spaced brushes 25 and 26 each having an unsupported end projected beyond the block and inwardly inclined toward the plunger. Suitable posts 27 are provided for attachment of the circuit wires. A slot 28 is also provided in the frame in register with a slot 29 formed in one of the housing walls adjacent the plunger 9. Extending through the two slots is a post 30 secured to the plunger and provided with a head 31 which is adapted to be moved into contact with the inwardly inclined ends of the two brushes, thereby completing a circuit therebetween. The post head accordingly serves as a conductor to close the switch when the plunger is in its normal or retracted position, such as occurs when the locking bolt is disengaged from the steering post.

One of the side walls of the slot 32 is laterally and obliquely extended, as shown in Fig. 3. The purpose of this is to provide an enlargement, or branch slot wherein the post 30 may enter if the plunger be rotated for this purpose. Any such rotary movement, however, involves a slight advance of the plunger against the tension of the spring 11. The result of this compound movement is to normally maintain the plunger in the position of Fig. 3 where the post remains in engagement with both brushes 25 and 26. Should it be desired, however, to open the circuit in which the switch is interposed, the plunger may be rotated for the slight distance required to move the post 30 laterally, thereby effecting its disengagement from the brush 26 so as to break the circuit. I accordingly combine in a single lock control the double function of opening the switch alone, or of operating the lock and switch conjointly.

From the preceding description, it should be apparent that the operator has at his command a single control means which, in an emergency, may be used for opening the switch. A lock-switch of the kind contemplated may be profitably associated with any one of several of the vital mechanisms of an automobile, such as its steering mechanism, its motor ignition circuit, its gear transmission, or elsewhere, the result in any such case being to disable the vehicle from operating, if the control be used in the normal manner, or to bring the motor to a stop, if the same control be given an emergency manipulation.

The various details of construction, as heretofore set forth, are manifestly susceptible of embodiment in forms other than the precise one shown, and any such modifications, in so far as they fall within the purview of the claims below are to be considered as embraced within the limits of my invention.

I claim:

1. In an automobile having a motor ignition circuit with an interposed switch, a lock associated with the switch and including a bolt having a two-way movement one of which is reciprocal only, a part of the switch being connected with the bolt and adapted to break the circuit when the bolt is reciprocated to locking position, and also to break the circuit when the bolt is non-reciprocatingly moved, substantially as described.

2. In an automobile having a motor ignition circuit with an interposed switch, a lock including a member having a two-way movement one of which is reciprocal only, and means connecting said member with the switch adapted to open the circuit with either movement of the member, substantially as described.

3. In an automobile having a motor ignition circuit, the combination of an associated lock in which is a bolt, manipulative means therefor movable in two ways of which one is in a straight line, a switch interposed in the motor ignition circuit, and means interconnecting the switch and manipulative means and operable to open the switch when the latter is moved in either of its two ways, substantially as described.

4. In an automobile having a motor ignition circuit, the combination of a lock, a switch in the circuit, means connecting the lock and switch whereby they may be operated together, and a single manipulative means having selectively a simple and compound movement in the former of which it operates both the lock and switch, and in the latter just the switch alone, substantially as described.

5. An automobile lock having a housing within which is contained a movable bolt together with a manipulative means therefor disposed in part exteriorly of the housing, said means being reciprocable within the housing to advance the bolt and having capacity for rotary movement relative thereto, and a switch associated with the lock for conjoint operation therewith and including a part which is reciprocable with the manipulative means to make or break the circuit in which the switch is interposed, said part also acting to make or break the circuit when said manipulative means is rotated, substantially as described.

6. An automobile lock having a housing in which is contained a movable bolt together with a reciprocable manipulative means therefor having one end disposed exteriorly of the housing, tension means for opposing inward movement of said manipulative means, a switch, and a connection from the manipulative means to the switch extending through a slot in the housing, the slot being enlarged to one side and provided with an inclined wall with which the connection engages when the manipulative means is rotated whereby upon release of pressure said means is restored to its normal position, substantially as described.

7. In an automobile having an electrical circuit, the combination of a lock including a movable member, a switch element connected fast for movement with said member, means whereby said member and element is guided selectively through either of two movement paths, and contacts interposed in the electrical circuit and cooperating with the element to provide a switch which is opened or closed with either movement of said element, substantially as described.

8. In an automobile having an electrical circuit, the combination of a lock including a movable member, a switch interposed in the circuit and having a movable element which is connected fast for movement with said member, and guiding means co-operating with said element to direct the same selectively through two movement paths in either of which the circuit may be opened or closed, substantially as described.

9. A mechanism in which is combined a lock in connection with an electrical switch, the switch comprising a pair of fixed contacts and a shiftable conductor movable in either of two directions in one of which it engages with both contacts and in the other of which it disengages from one contact only, and operating means for the lock and switch adapted to transmit to the latter either of said movements, the lock also being actuated thereby with one only of said movements, substantially as described.

10. A mechanism in which is combined a lock in connection with an electrical switch together with means for operating same, the switch comprising a pair of contacts and a shiftable conductor selectively movable in response to actuation of the operating means to disengage simultaneously with both contacts or with one only, substantially as described.

11. An electrical switch in which is comprised a pair of fixed contacts, a conductor engageable therewith, and means forming a guideway wherein the conductor may be reciprocated to either of two positions or be shifted laterally to a third position, the conductor when in one position being engaged with both contacts, when in a second position being disengaged from both contacts, and when in the third position being engaged with one contact only, substantially as described.

12. In a lock, the combination with an operating member, of a bolt movable into engagement with said member to oppose operation thereof, a switch interposed in an electrical circuit, a control means for the bolt, and a connection between the control means and switch operable to actuate the latter alone or in conjunction with the bolt, substantially as described.

13. In a lock, the combination with an operating member, of a bolt movable into engagement with said member to oppose operation thereof, a switch interposed in an electrical circuit, and a control means for the bolt connected also with the switch and reciprocable to actuate the bolt and switch together or oscillatable to actuate only the switch, substantially as described.

14. In combination, a locking mechanism including a part having a dual movement and an associated electrical switch in which is comprised a mounting for fixed contacts and a guideway in which a movable contact is supported while sliding either longitudinally or laterally, and a pin connection extending from said part for shifting the movable contact either longitudinally or laterally to make or break electrical connection with said contacts, substantially as described.

15. In combination, a locking mechanism including a part having a dual movement, and an associated electrical switch in which is comprised a mounting for fixed contacts and a guideway in which is supported a movable contact adapted to slide both longitudinally and laterally, the guideway being adapted to control direction of movement of the movable contact, and means connected with said part for shifting the movable contact either longitudinally or laterally into and out of engagement with the fixed contacts, substantially as described.

16. A mechanism in which is combined a lock in connection with an electrical switch, the switch comprising a pair of fixed contacts and a shiftable conductor movable in either of two directions in one of which it engages with both contacts and in the other of which it disengages from one contact only, and operating means for the lock and switch adapted to transmit to the latter either of said movements, the lock also being actuated thereby with one only of said movements, substantially as described.

17. A mechanism in which is combined a lock in connection with an electrical switch together with means for operating same, the switch comprising a pair of contacts and a shiftable conductor selectively movable in response to actuation of the operating means to disengage simultaneously with both contacts or with only one, substantially as described.

18. An electrical switch in which is comprised a pair of fixed contacts, a conductor engageable therewith, and means forming a guideway wherein the conductor may be reciprocated to either of two positions or be shifted laterally to a third position, the conductor when in one position being engaged with both contacts, when in a second position being disengaged from both contacts, and when in the third position being engaged with one contact only, substantially as described.

19. An electrical switch in which is comprised a pair of fixed contacts, a conductor engageable therewith, and means forming a guideway wherein the conductor may be reciprocated to either of two positions or be shifted laterally to a third position, the conductor when in one position being engaged with both contacts, when in a second position being disengaged from both contacts, and when in the third position being disengaged from one contact, substantially as described.

20. In combination, a housing wherein is a locking mechanism in which is included a yieldable control, a switch, means for connecting the switch removably to the housing, and operating means for the switch connected loosely therewith and fast with the yieldable control, substantially as described.

21. In combination, a locking mechanism having a yieldable control, a switch mechanism detachably associated therewith, and operating means connected fast with the yieldable control and loosely with the switch mechanism and adapted upon detachment of the latter to freely break connection therewith, substantially as described.

ORVILLE S. HERSHEY.